United States Patent
Choi

(10) Patent No.: US 10,959,529 B2
(45) Date of Patent: *Mar. 30, 2021

(54) CONNECTING STRUCTURE AND BED FRAME HAVING SAME

(71) Applicant: Inno-Sports Co., Ltd., Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 45 days.

This patent is subject to a terminal disclaimer.

(21) Appl. No.: 16/505,567

(22) Filed: Jul. 8, 2019

(65) Prior Publication Data
US 2020/0022501 A1 Jan. 23, 2020

(30) Foreign Application Priority Data
Jul. 17, 2018 (CN) .......................... 201821129833.8

(51) Int. Cl.
*A47C 19/12* (2006.01)
*A47C 19/00* (2006.01)
*A47C 19/02* (2006.01)

(52) U.S. Cl.
CPC ............ *A47C 19/12* (2013.01); *A47C 19/005* (2013.01); *A47C 19/021* (2013.01)

(58) Field of Classification Search
CPC ....... A47C 19/00; A47C 19/005; A47C 19/02; A47C 19/021; A47C 19/025; A47C 19/12
USPC ..... 5/200.1, 201, 202, 282.1, 285, 286, 288, 5/290
See application file for complete search history.

(56) References Cited

U.S. PATENT DOCUMENTS

| | | | |
|---|---|---|---|
| 769,949 A * | 9/1904 | Kutz | F16B 12/58 5/294 |
| 1,518,969 A * | 12/1924 | Dyke | F16B 12/56 5/290 |
| 1,617,865 A * | 2/1927 | Richardson | F16B 12/58 5/288 |
| 1,833,692 A | 11/1931 | Silvio | |
| 2,492,070 A | 12/1949 | Stone et al. | |
| 2,983,931 A | 5/1961 | Nelson | |
| 8,832,876 B1 | 9/2014 | Oh | |
| 8,978,176 B1 | 3/2015 | Oh | |
| 9,492,017 B2 | 11/2016 | Oh | |
| 10,702,070 B2 | 7/2020 | Oh | |
| 2014/0345047 A1 | 11/2014 | Oh | |

(Continued)

OTHER PUBLICATIONS

U.S. Appl. No. 16/506,575, filed Jul. 9, 2019.

*Primary Examiner* — Robert G Santos
(74) *Attorney, Agent, or Firm* — Morgan, Lewis & Bockius LLP

(57) ABSTRACT

A bed frame includes outer lateral and longitudinal bar units, each having a first end and a second end. Each of first, second, third, and fourth longitudinal bar units includes an upper longitudinal bar and a lower longitudinal bar. The first ends of the first and second longitudinal bar units are rotatably connected with each other. The first ends of the third and fourth longitudinal bar units are rotatably connected with each other. Of each respective longitudinal bar unit, the second end of the upper longitudinal bar is movably connected with the first or second end of a corresponding lateral bar unit, and the second end of the lower longitudinal bar is fixedly connected with the first or second end of the corresponding lateral bar unit.

15 Claims, 2 Drawing Sheets

(56) References Cited

U.S. PATENT DOCUMENTS

| | | |
|---|---|---|
| 2015/0089740 A1 | 4/2015 | Oh |
| 2018/0042391 A1* | 2/2018 | Oh |
| 2020/0022501 A1* | 1/2020 | Choi .................. A47C 19/12 |
| 2020/0022503 A1* | 1/2020 | Choi .................. A47C 19/12 |
| 2020/0375367 A1 | 12/2020 | Qiu |
| 2020/0378426 A1 | 12/2020 | Choi |

* cited by examiner

CONNECTING STRUCTURE AND BED FRAME HAVING SAME

CROSS-REFERENCE TO RELATED APPLICATIONS

The present application claims priority to Chinese Utility Model Application CN 201821129833.8 filed Jul. 17, 2018. The disclosure of the application is incorporated herein for all purposes by reference in its entirety.

FIELD OF THE INVENTION

The present invention generally relates to bed frames, and more particularly, to connecting structures, and bed frames having connecting structures.

BACKGROUND

Beds are usually the main furniture in bedrooms and often occupy the majority of the space. In modern days, foldable beds become daily necessities in particular when the space is limited. Foldable beds are desirable because they are convenient to use and require less space for storage. However, lateral and longitudinal bar units of most existing bed frames are welded together. It is expensive to make such bed frames. In addition, the resulted frames are difficult to fold, in particular, when the lateral or longitudinal bar unit is made of a stack of bars.

Given the current state of the art, there remains a need for collecting structures and bed frames that address the above-mentioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present invention provides connecting structures and bed frames having such connecting structures.

In various exemplary embodiments, the present invention provides a bed frame including first and second longitudinal bar assemblies, and first and second outer lateral bar units. Each of the first and second longitudinal bar assemblies has a first end and a second end, and includes an upper longitudinal bar and a lower longitudinal bar. The upper longitudinal bar includes a slot facing downward at each of the first and second ends of the upper longitudinal bar. The lower longitudinal bar includes a first hole at each of the first and second ends of the lower longitudinal bar. Each of the first and second outer lateral bar units has a first end and a second end. At each of the first and second ends of each of the first and second outer lateral bar units, an upper receptacle is disposed at an upper portion thereof and a lower receptacle is disposed at a lower portion thereof. The upper receptacle is configured to receive the first or second end of the upper longitudinal bar of the first or second longitudinal bar assembly. The upper receptacle includes a pin removably engageable with the slot of the upper longitudinal bar. The lower receptacle is configured to receive the first or second end of the lower longitudinal bar of the first or second longitudinal bar assembly. The lower receptacle includes a second hole, and the lower longitudinal bar is connected with the lower receptacle by a fastener via the first and second holes.

In an exemplary embodiment, each of the upper and lower receptacles is a notch made of a piece with two sides bent upwardly.

In some exemplary embodiments, each of the first and second lateral bar unit includes an upper lateral bar, a lower lateral bar, and a tubular piece connecting the ends of the upper and lower lateral bars.

In an exemplary embodiment, the tubular piece has a planar surface, and the upper and lower receptacles are disposed at the planar surface of the tubular piece.

In various exemplary embodiments, the present invention provides a connecting structure of a bed frame, wherein the bed frame includes a longitudinal bar unit and a lateral bar unit, and the longitudinal bar unit includes an upper longitudinal bar and a lower longitudinal bar. The connecting structure includes an upper receptacle and a lower receptacle. The upper receptacle is disposed at an upper portion of an end of the lateral bar unit, and configured to receive and movably couple with an end of the upper longitudinal bar of the longitudinal bar unit. The lower receptacle is disposed at a lower portion of the end of the lateral bar unit, and configured to receive and fixedly couple with an end of the lower longitudinal bar of the longitudinal bar unit. The upper longitudinal bar includes a slot facing downward at the end of the upper longitudinal bar. The lower longitudinal bar includes a first hole at the end of the lower longitudinal bar. The upper receptacle includes a pin movably engageable with the slot of the upper longitudinal bar. The lower receptacle includes a second hole, wherein the lower longitudinal bar is connected with the lower receptacle by a fastener via the first and second holes.

In an exemplary embodiment, each of the upper and lower receptacles is a notch made of a piece with two sides bent upwardly.

In some exemplary embodiments, the lateral bar unit includes an upper lateral bar, a lower lateral bar, and a tubular piece fixedly connecting the ends of the upper and lower lateral bars.

In an exemplary embodiment, the tubular piece has a planar surface, wherein the upper and lower receptacles are fixedly disposed at the planar surface of the tubular piece.

In various exemplary embodiments, the present invention provides a bed frame including first and second outer lateral bar units, and first, second, third, and fourth longitudinal bar units. Each of the first and second outer lateral bar units has a first end and a second end. Each of the first, second, third, and fourth longitudinal bar units had a first end and a second end, and includes an upper longitudinal bar and a lower longitudinal bar. The first ends of the first and second longitudinal bar units are rotatably connected with each other. The first ends of the third and fourth longitudinal bar units are rotatably connected with each other. The second end of the upper longitudinal bar of each respective longitudinal bar unit is movably connected with the first or second end of the corresponding first or second lateral bar unit. The second end of the lower longitudinal bar of each respective longitudinal bar unit is fixedly connected with the first or second end of the corresponding first or second lateral bar unit.

In some exemplary embodiments, the upper longitudinal bar includes a slot facing downward at the second end thereof, and the lower longitudinal bar includes a first hole at the second end thereof. Each end of the first and second outer lateral bar units includes an upper receptacle at an upper portion thereof, and a lower receptacle at a lower portion thereof. The upper receptacle is configured to receive the second end of the upper longitudinal bar of the corresponding first, second, third or fourth longitudinal bar unit, wherein the upper receptacle includes a pin removably engageable with the slot of the upper longitudinal bar. The lower receptacle is configured to receive the second end of the lower longitudinal bar of the corresponding first, second, third or fourth longitudinal bar unit, wherein the lower receptacle includes a second hole, wherein the lower longitudinal bar is connected with the lower receptacle by a fastener via the first and second holes.

In some exemplary embodiments, each of the upper and lower receptacles is a notch made of a piece with two sides bent upwardly.

In some exemplary embodiments, the first or second lateral bar unit includes an upper lateral bar, a lower lateral bar, and a tubular piece fixedly connecting the ends of the upper and lower lateral bars.

In an exemplary embodiment, the tubular piece has a planar surface, wherein the upper and lower receptacles are fixedly disposed at the planar surface of the tubular piece.

In some exemplary embodiments, the bed frame further includes an inner lateral bar unit having a first end and a second end. The first end of the first longitudinal bar unit is rotatably connected with the first end of the inner lateral bar unit, the first end of the second longitudinal bar unit is rotatably connected with the second end of the inner lateral bar unit, the first end of the third longitudinal bar unit is rotatably connected with the first end of the inner lateral bar unit, and the first end of the fourth longitudinal bar unit is rotatably connected with the second end of the inner lateral bar unit.

In some exemplary embodiments, each of the first and second outer lateral bar units includes an upper outer lateral bar and a lower outer lateral bar.

The connecting structures and bed frames of the present invention have other features and advantages that will be apparent from, or are set forth in more detail in, the accompanying drawings, which are incorporated herein, and the following Detailed Description, which together serve to explain certain principles of exemplary embodiments of the present invention.

BRIEF DESCRIPTION OF THE DRAWINGS

The accompanying drawings, which are incorporated into and constitute a part of this specification, illustrate one or more exemplary embodiments of the present invention and, together with the Detailed Description, serve to explain the principles and implementations of exemplary embodiments of the invention.

Figure 1:
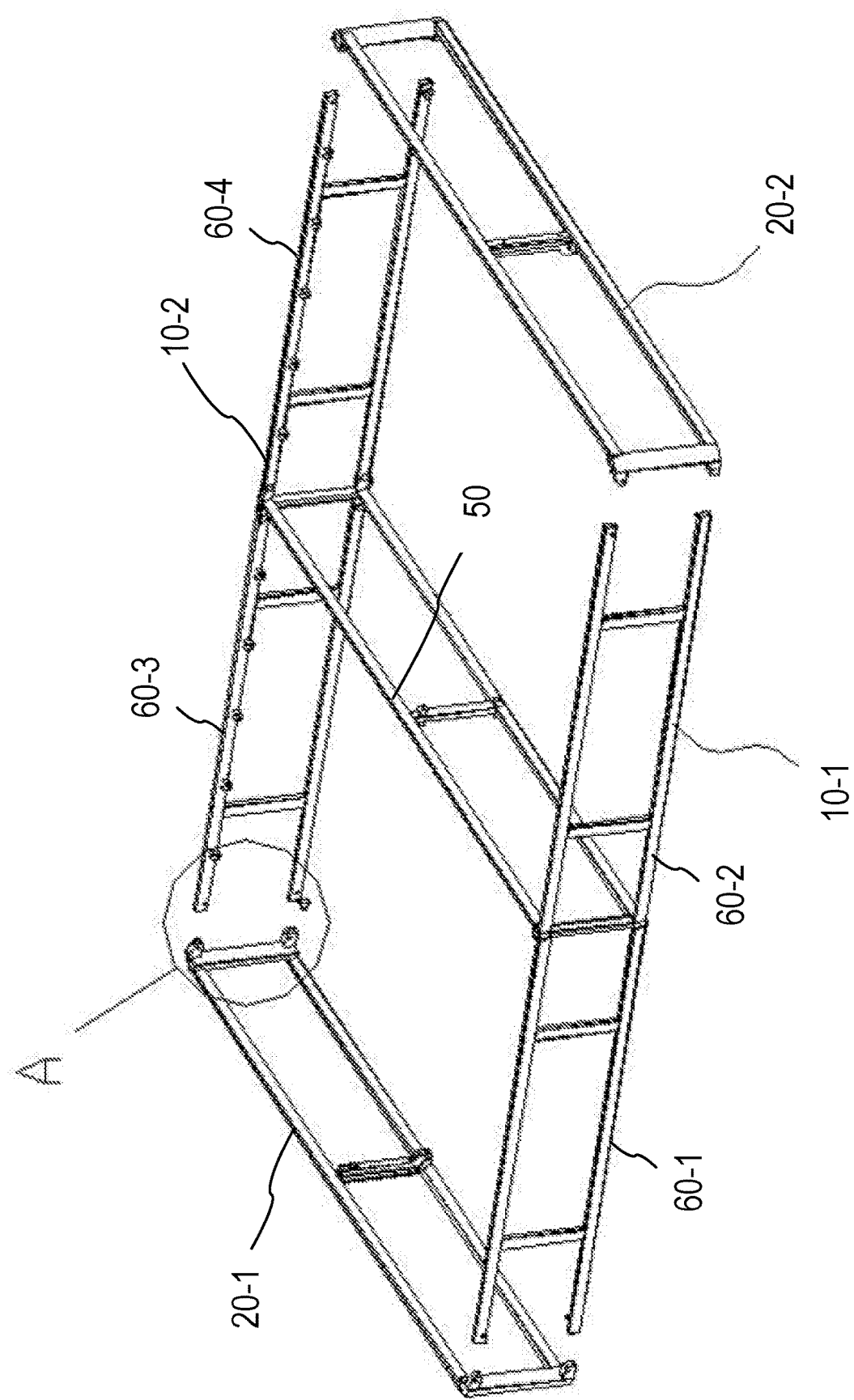
FIG. 1 is a partially disassembled perspective view illustrating an exemplary bed frame in accordance with exemplary embodiments of the present invention.

As will be apparent to those of skill in the art, the components illustrated in the figures described above are combinable in any useful number and combination. The figures are intended to be illustrative in nature and are not limiting.

DETAILED DESCRIPTION

Reference will now be made in detail to implementations of exemplary embodiments of the present invention as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present invention will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present invention are described in the context of connecting structures and bed frames having such connecting structures. The bed frames of the present invention can be of various sizes including but not limited to twin, full, queen and king sizes, and of various shapes including but not limited to rectangles and squares. They can be made of various materials including but not limited to metals (e.g., cast iron, steel, and aluminum), plastics and woods.

In general, a bed frame of the present invention includes outer lateral bar units, and longitudinal bar assemblies connected with the outer lateral bar units by connecting structures disclosed herein. A longitudinal bar assembly includes one or more longitudinal bar units. A connecting structure connects a lateral bar unit with a longitudinal bar unit of a longitudinal bar assembly.

An exemplary connecting structure includes an upper receptacle and a lower receptacle. In various exemplary embodiments, the longitudinal bar unit includes an upper longitudinal bar and a lower longitudinal bar. The upper receptacle is disposed at an upper portion of an end of the lateral bar unit and configured to receive and movably couple with an end of the upper longitudinal bar of the longitudinal bar unit. The lower receptacle is disposed at a lower portion of the end of the lateral bar unit, and configured to receive and fixedly couple with an end of the lower longitudinal bar of the longitudinal bar unit. As such, a bed frame with the connecting structures of the present invention is both flexible and stable.

Alternatively, in some exemplary embodiments, the lateral bar unit includes an upper lateral bar and a lower lateral bar. The upper receptacle is disposed at an upper portion of an end of the longitudinal bar unit and configured to receive and movably couple with an end of the upper lateral bar of the lateral bar unit. The lower receptacle is disposed at a lower portion of the end of the longitudinal bar unit, and configured to receive and fixedly couple with an end of the lower lateral bar of the lateral bar unit. As such, a bed frame with the connecting structures of the present invention is also both flexible and stable.

Figure 2:
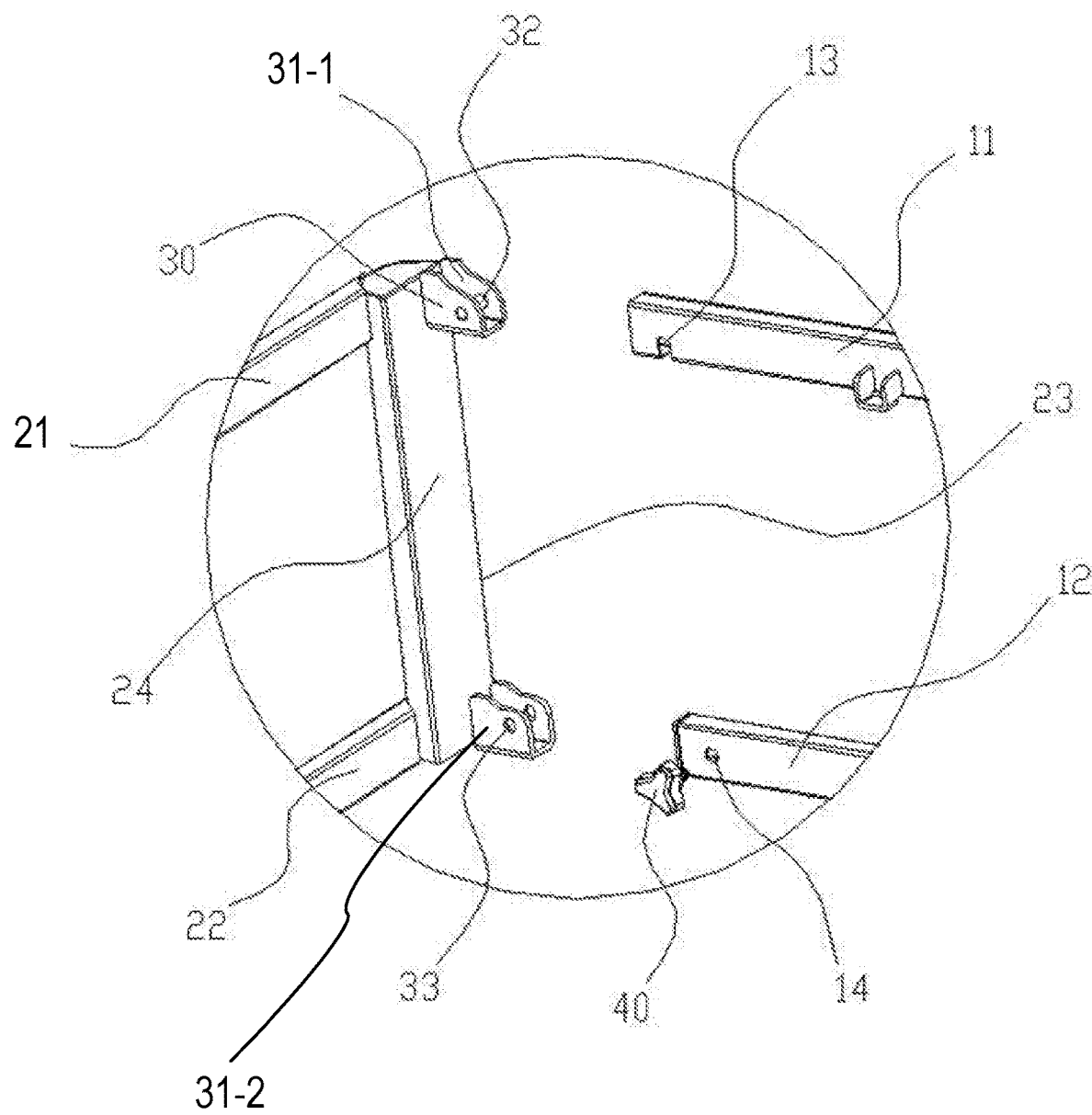
FIG. 2 is an enlarged view taken along circle A of FIG. 1.

By way of example, FIGS. 1 and 2 illustrate a bed frame including first longitudinal bar assembly 10-1, second longitudinal bar assembly 10-2, first outer lateral bar unit 20-1, and second outer lateral bar unit 20-2. Disposed at each end of the first outer lateral bar unit 20-1 and second outer lateral bar unit 20-2 is an upper receptacle such as upper receptacle 31-1 and a lower receptacle such as lower receptacle 31-2. The upper receptacle is configured to receive and movably connect with an end of an upper longitudinal bar such as upper longitudinal bar 11 of the first or second longitudinal bar assembly. The lower receptacle is configured to receive and fixedly connect with an end of a lower longitudinal bar such as lower longitudinal bar 12 of the first or second longitudinal bar assembly.

In some exemplary embodiments, the upper longitudinal bar includes a slot such as slot 13 facing downward at the end of the upper longitudinal bar. Corresponding to the slot, the upper receptacle includes a pin such as pin 32 movably engageable with the slot of the upper longitudinal bar.

In some exemplary embodiments, the lower longitudinal bar includes a hole such as first hole 14 at the end of the lower longitudinal bar. Corresponding to the first hole, the lower receptacle includes a second hole such as second hole 33. In an exemplary embodiment, the lower longitudinal bar is connected with the lower receptacle by a fastener such as fastener 40 (e.g., locking bolt, locking screw) via the first and second holes.

In some exemplary embodiments, the upper or lower receptacle is a notch made of a piece with two sides bent upwardly. For instance, by way of example, FIG. 2 illustrates the upper receptacle made of piece 30 with two sides bent upwardly.

In some exemplary embodiments, the first or second outer lateral bar unit includes an upper outer lateral bar, a lower outer lateral bar, and a tubular piece connecting the ends of the upper and lower outer lateral bars. In an exemplary embodiment, the tubular piece is fixedly connecting the ends of the upper and lower outer lateral bars. For instance, by way of example, FIG. 2 illustrates the first outer lateral bar unit includes upper outer lateral bar 21, lower outer lateral bar 22, and tubular piece 23 fixedly connecting the ends of the upper and lower outer lateral bars. In some exemplary embodiments, a tubular piece is disposed at each end of the first or second outer lateral bar unit.

In some exemplary embodiments, the tubular piece has a planar surface such as planar surface 24, and the upper and lower receptacles are disposed at the planar surface of the tubular piece. In an exemplary embodiment, the upper and lower receptacles are fixedly disposed at the planar surface of the tubular piece.

In various exemplary embodiments, each of the first and second longitudinal bar assemblies include one, two, three or more longitudinal bar units rotatably connected with each other at adjacent ends. By way of example, FIG. 1 illustrates each of first and second longitudinal bar assemblies including two longitudinal bar units, i.e., first longitudinal bar assembly 10-1 including first longitudinal bar unit 60-1 and second longitudinal bar unit 60-2 and second longitudinal bar assembly 10-2 including third longitudinal bar unit 60-3 and fourth longitudinal bar unit 60-4. First longitudinal bar unit 60-1 and second longitudinal bar unit 60-2 are rotatably connected (directly or indirectly) with each other at their adjacent ends. Third longitudinal bar unit 60-3 and fourth longitudinal bar unit 60-4 are rotatably connected (directly or indirectly) with each other at their adjacent ends.

In some exemplary embodiments, the bed frame further includes one or more inner lateral bar units. By way of example, FIG. 1 illustrates the bed frame including inner lateral bar unit 50. In an exemplary embodiment, each of the first and second longitudinal bar units is rotatably connected with a first end of the inner lateral bar unit, and each of the third and fourth longitudinal bar units is rotatably connected with a second end of the inner lateral bar unit. As such, once the first and second outer lateral bar units are removed, each of the first, second, third and fourth longitudinal bar units can be rotated toward and folded onto the inner lateral bar unit.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "lower" or "upper", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first longitudinal bar unit could be termed a second longitudinal bar unit, and, similarly, a second longitudinal bar unit could be termed a first longitudinal bar unit, without changing the meaning of the description, so long as all occurrences of the "first longitudinal bar unit" are renamed consistently and all occurrences of the "second longitudinal bar unit" are renamed consistently.

What is claimed is:

1. A bed frame comprising:
    first and second longitudinal bar assemblies, each having a first end and a second end, and each comprising an upper longitudinal bar and a lower longitudinal bar, wherein
        the upper longitudinal bar comprises a slot facing downward at each of the first and second ends of the upper longitudinal bar; and
        the lower longitudinal bar comprises a first hole at each of the first and second ends of the lower longitudinal bar; and
    first and second outer lateral bar units, each having a first end and a second end, wherein at each of the first and second ends of each of the first and second outer lateral bar units,
        an upper receptacle is disposed at an upper portion thereof and configured to receive the first or second end of the upper longitudinal bar of the first or second longitudinal bar assembly, wherein the upper receptacle comprises a pin removably engageable with the slot of the upper longitudinal bar; and
    a lower receptacle is disposed at a lower portion thereof and configured to receive the first or second end of the lower longitudinal bar of the first or second longitudinal bar assembly, wherein the lower receptacle comprises a second hole, wherein the lower longitudinal bar is connected with the lower receptacle by a fastener via the first and second holes.

2. The bed frame of claim 1, wherein each of the upper and lower receptacles is a notch made of a piece with two sides bent upwardly.

3. The bed frame of claim 1, wherein each of the first and second lateral bar units comprises an upper lateral bar, a lower lateral bar, and a tubular piece connecting the ends of the upper and lower lateral bars.

4. The bed frame of claim 3, wherein the tubular piece has a planar surface, wherein the upper and lower receptacles are disposed at the planar surface of the tubular piece.

5. A connecting structure of a bed frame, wherein the bed frame comprises a longitudinal bar unit and a lateral bar unit, and the longitudinal bar unit comprises an upper longitudinal bar and a lower longitudinal bar, the connecting structure comprising:
an upper receptacle at an upper portion of an end of the lateral bar unit, and configured to receive and movably couple with an end of the upper longitudinal bar of the longitudinal bar unit; and
a lower receptacle at a lower portion of the end of the lateral bar unit, and configured to receive and fixedly couple with an end of the lower longitudinal bar of the longitudinal bar unit,
wherein
the upper longitudinal bar comprises a slot facing downward at the end of the upper longitudinal bar; and
the lower longitudinal bar comprises a first hole at the end of the lower longitudinal bar;
the upper receptacle comprises a pin movably engageable with the slot of the upper longitudinal bar; and
the lower receptacle comprises a second hole, wherein the lower longitudinal bar is connected with the lower receptacle by a fastener via the first and second holes.

6. The connecting structure of claim 5, wherein each of the upper and lower receptacles is a notch made of a piece with two sides bent upwardly.

7. The connecting structure of claim 5, wherein the lateral bar unit comprises an upper lateral bar, a lower lateral bar, and a tubular piece fixedly connecting the ends of the upper and lower lateral bars.

8. The connecting structure of claim 7, wherein the tubular piece has a planar surface, wherein the upper and lower receptacles are fixedly disposed at the planar surface of the tubular piece.

9. A bed frame comprising:
first and second outer lateral bar units, each having a first end and a second end; and
first, second, third, and fourth longitudinal bar units, each having a first end and a second end, and each comprising an upper longitudinal bar and a lower longitudinal bar, wherein
the first ends of the first and second longitudinal bar units are rotatably connected with each other;
the first ends of the third and fourth longitudinal bar units are rotatably connected with each other;
the second end of the upper longitudinal bar of each respective longitudinal bar unit is movably connected with the first or second end of the corresponding first or second lateral bar unit; and
the second end of the lower longitudinal bar of each respective longitudinal bar unit is fixedly connected with the first or second end of the corresponding first or second lateral bar unit.

10. The bed frame of claim 9, wherein
the upper longitudinal bar comprises a slot facing downward at the second end thereof; and
the lower longitudinal bar comprises a first hole at the second end thereof;
each end of the first and second outer lateral bar units comprises:
an upper receptacle at an upper portion thereof to receive the second end of the upper longitudinal bar of the corresponding first, second, third or fourth longitudinal bar unit, wherein the upper receptacle comprises a pin removably engageable with the slot of the upper longitudinal bar; and
a lower receptacle at a lower portion thereof to receive the second end of the lower longitudinal bar of the corresponding first, second, third or fourth longitudinal bar unit, wherein the lower receptacle comprises a second hole, wherein the lower longitudinal bar is connected with the lower receptacle by a fastener via the first and second holes.

11. The bed frame of claim 10, wherein each of the upper and lower receptacles is a notch made of a piece with two sides bent upwardly.

12. The bed frame of claim 10, wherein the first or second lateral bar unit comprises an upper lateral bar, a lower lateral bar, and a tubular piece fixedly connecting the ends of the upper and lower lateral bars.

13. The bed frame of claim 12, wherein the tubular piece has a planar surface, wherein the upper and lower receptacles are fixedly disposed at the planar surface of the tubular piece.

14. The bed frame of claim 9, further comprising:
an inner lateral bar unit having a first end and a second end, wherein
the first end of the first longitudinal bar unit is rotatably connected with the first end of the inner lateral bar unit,
the first end of the second longitudinal bar unit is rotatably connected with the second end of the inner lateral bar unit,
the first end of the third longitudinal bar unit is rotatably connected with the first end of the inner lateral bar unit, and
the first end of the fourth longitudinal bar unit is rotatably connected with the second end of the inner lateral bar unit.

15. The bed frame of claim 9, wherein each of the first and second outer lateral bar units comprises an upper outer lateral bar and a lower outer lateral bar.

* * * * *

UNITED STATES PATENT AND TRADEMARK OFFICE
CERTIFICATE OF CORRECTION

Page 1 of 1

PATENT NO. : 10,959,529 B2
APPLICATION NO. : 16/505567
DATED : March 30, 2021
INVENTOR(S) : Choi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 59 days.

Signed and Sealed this
Seventh Day of February, 2023

Katherine Kelly Vidal
*Director of the United States Patent and Trademark Office*